United States Patent [19]

Grundy

[11] Patent Number: 5,197,329

[45] Date of Patent: Mar. 30, 1993

[54] PTC WATER LEVEL SENSOR AND CONTROL

[75] Inventor: Andrew G. Grundy, Webster City, Iowa

[73] Assignee: White Consolidated Industries, Inc., Cleveland, Ohio

[21] Appl. No.: 888,339

[22] Filed: May 22, 1992

[51] Int. Cl.$^5$ ............................................. G01F 23/24
[52] U.S. Cl. .......................................... 73/295; 338/27; 338/307; 338/308; 338/320; 338/260; 68/12.05; 68/12.21
[58] Field of Search ................... 73/295; 338/27, 307, 338/308, 320, 260; 68/12.05, 12.21

[56] References Cited

U.S. PATENT DOCUMENTS

| | | | |
|---|---|---|---|
| 3,058,303 | 10/1962 | Mulready | 73/295 |
| 3,111,031 | 11/1963 | Kuritza | 73/295 |
| 3,145,567 | 8/1964 | Bobrowsky | 73/295 |
| 3,485,100 | 12/1969 | Petersen | 73/295 |
| 3,882,967 | 5/1975 | Gulla et al. | 73/295 |
| 4,129,848 | 12/1978 | Frank et al. | 73/295 |
| 4,425,795 | 1/1984 | Albrecht et al. | 73/295 |
| 4,449,404 | 5/1984 | Bohme et al. | 73/295 |
| 4,564,834 | 1/1986 | Steele | 73/295 |
| 4,630,025 | 12/1986 | Boudolleau | 338/308 |
| 4,720,997 | 1/1988 | Doak et al. | 73/295 |
| 4,780,705 | 10/1988 | Beane | 73/304 C |
| 5,008,653 | 4/1991 | Kidd et al. | 73/304 R |
| 5,097,248 | 3/1992 | Kumada et al. | 73/304 R |

FOREIGN PATENT DOCUMENTS

| | | | |
|---|---|---|---|
| 2423415 | 11/1975 | Fed. Rep. of Germany | 73/295 |
| 0155207 | 5/1982 | Fed. Rep. of Germany | 73/295 |
| 0022948 | 2/1977 | Japan | 73/295 |
| 0261928 | 11/1987 | Japan | 73/295 |
| 2120482 | 11/1983 | United Kingdom | 73/295 |

Primary Examiner—William A. Cuchlinski, Jr.
Assistant Examiner—Diego F. F. Gutierrez
Attorney, Agent, or Firm—Pearne, Gordon, McCoy & Granger

[57] ABSTRACT

A PTC resistive strip is mounted on a wall of a washer tub. Water in the tub carries away heat from the energized strip thereby reducing its resistance. The water level in the tub is measured by measuring the voltage drop across the strip. The resistance of the strip can be compared to the resistance across a variable resistance or resistor to indicate that the water has reached a desired level. A comparator output can be used to control the water level and washer motor operation via a control circuit which operates the water supply valves and motor switch. A second PTC resistive element is also provided for sensing overfill.

16 Claims, 3 Drawing Sheets

PTC WATER LEVEL SENSOR AND CONTROL

BACKGROUND OF THE INVENTION

This invention relates generally to the field of liquid level sensing and control and specifically to a positive temperature coefficient sensor and associated control circuit for a clothes washing machine.

Thermal water level detectors have been used in a variety of configurations. Generally, the electrical resistance of the sensing element varies as a function of temperature. The element is mounted in the water container so that when the water covers the element, its temperature, and therefore its resistance, changes. This change in resistance is detected by a circuit which provides an indication that the water has reached the level of the sensor. Various changes to this basic configuration which improve the thermal characteristics and accuracy have been disclosed.

Positive Temperature Coefficient resistors are commonly used as sensing elements. A PTC resistor is a device that increases in electrical resistance as its temperature increases. As a heater it will self-regulate its own temperature and will not go into thermal runaway.

One disadvantage of this type of circuit is that only one water level can be detected. In order to detect more levels, other sensors and associated circuits must be added at each level to be measured.

SUMMARY OF THE INVENTION

The present invention senses and controls a liquid level in a container over a continuous range of levels without using a discrete sensor and control circuit for each level. The invention includes a positive temperature coefficient resistive strip adapted to have a voltage supplied to it which is installed on a wall of the container so that liquid in proximity to the strip can carry away heat to reduce the resistance of the strip. Means to vary a voltage drop between two reference points is also provided. Further, means to compare the voltage across the PTC strip with the voltage between the two points so that when the liquid in the container reaches a level where the voltage drop across the PTC strip is approximately equal to the voltage drop between the two points, an output of the comparison means indicates that the liquid is at a specified level.

PTC resistive ink can be silk screened on a thin film to make a very thin sensor strip. The liquid level control system uses this PTC resistive strip to sense the water level in a washing machine or other tub. The strip is mounted on a wall of the tub and an electrical current is applied to the strip. As the current passes through the strip, the PTC material heats up and the resistance of the strip increases until the current becomes constant.

A control circuit energizes valves which allow liquid to fill the tub. As the liquid level rises, it comes in proximity to the resistive strip. The liquid absorbs the heat generated by the PTC material of the strip. The liquid cools PTC material causing it to be less resistive. This creates an increase in electrical current through the heater which is sensed by the controller as a voltage. The control circuit compares the voltage across the PTC strip with the voltage across a variable resistance or other means to vary a voltage drop set by the operator. When the voltages are approximately equal, the controller will act to close the valves and energize the washer motor circuit.

An additional PTC resistor element can be located above the strip to sense an overfill. Its operation would be similar except that its voltage would be compared to the voltage across a fixed value resistor.

DESCRIPTION OF THE PREFERRED EMBODIMENT

Figure 1:
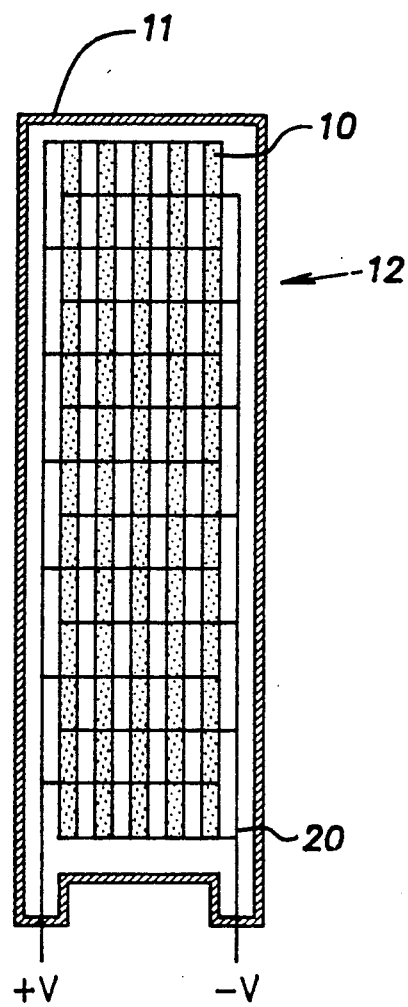
FIG. 1 is a front view of a PTC resistive strip.
Figure 2:
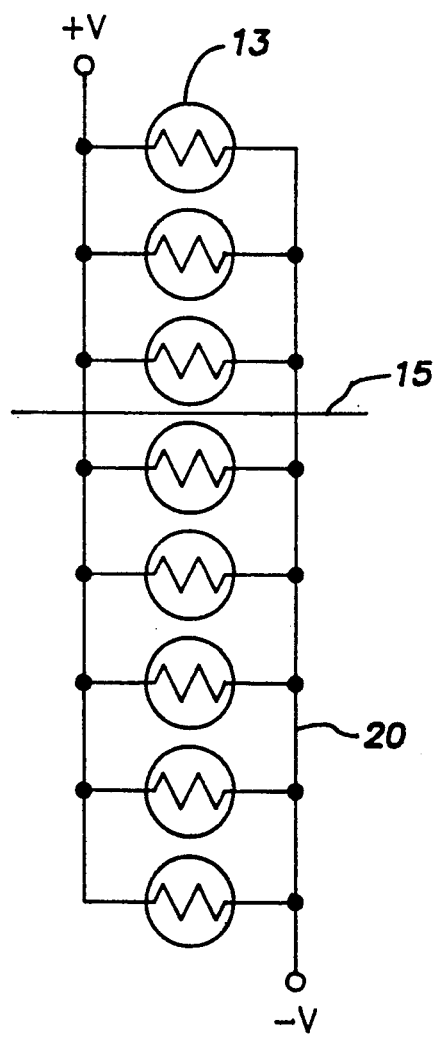
FIG. 2 is a schematic view of a PTC resistive strip.

In the preferred embodiment of FIG. 1, positive temperature coefficient elements 10 are silk screened on a plastic film of a material such as polyester, for example, and connected by conductors 20 in a parallel circuit arrangement to form a PTC resistive strip 12. PTC materials are known in the art and, in the preferred embodiment, the resistive strip 12 would be similar to a PTC Heater used to melt ice on automotive windows sold by ITW Chronomatic. Other forms of PTC resistors can also be used. When used in a washer tub the strip 12 should be about 12 to 15 inches long, 1 to 3 inches wide and 0.03 to 0.10 inches thick, however, the actual dimensions will depend on liquid container size. Electrically the strip has the characteristics of a plurality of PTC elements 13 connected in parallel as shown in FIG. 2.

Figure 3:
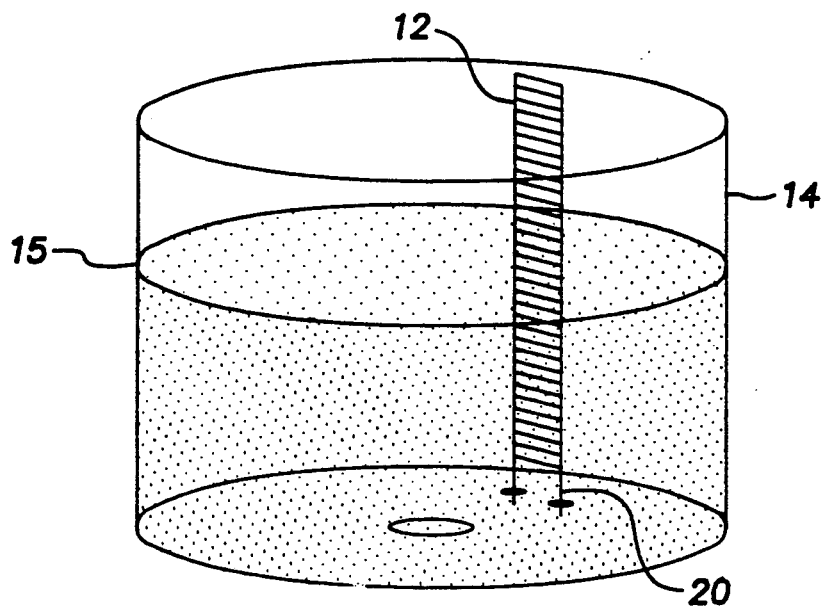
FIG. 3 is a perspective view of a PTC resistive strip installed in a washer splash tub.

The strip 12 is shown installed on a wall of a container such as a washer splash tub 14 shown in FIG. 3. The strip 12 should be mounted vertically on the inside wall of the tub 14 so that it extends beyond the upper and lower limits of the liquid levels to be sensed. Alternatively, the strip can be mounted on the outside of the container wall 14 to prevent wear or degradation of the strip caused by the contents of the container 14. A typical liquid level 15 is shown in FIGS. 2 and 3.

Figure 4:
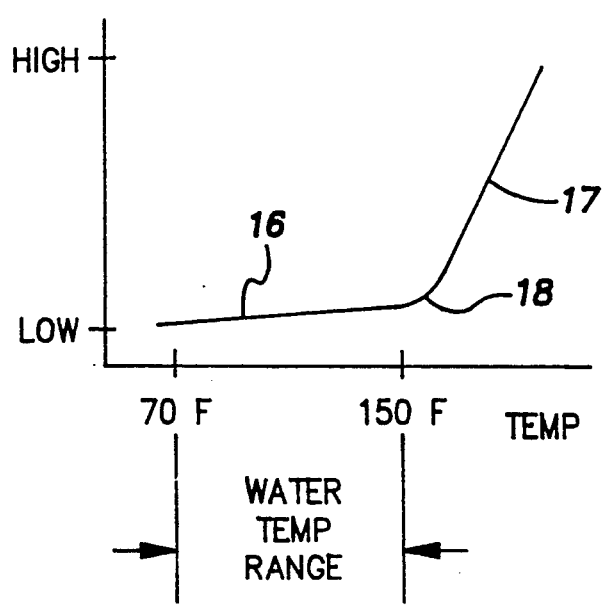
FIG. 4 is a graph of temperature versus resistance for a PTC resistive material.

FIG. 4 shows a typical resistance response curve of a PTC material as a function of its temperature. The curve is exponential and has an essentially horizontal region which represents an essentially constant resistance region 16 of a PTC material. At some temperature, the slope of the curve increases significantly at a knee 18 to where it approaches vertical. This steep slope represents a positive temperature coefficient region 17 of the PTC material where any increase in the temperature of the PTC material causes a significant increase in the resistance of the material. The PTC material should be selected so that the knee 18 between the two regions 16 and 17 of the curve is above the highest normal water temperature.

By supplying a voltage to the resistive strip 12, its temperature relative to the knee 18 can be determined. When a voltage is supplied to a PTC element 13, a current flows through it and its temperature increases. Initially the resistance of the element remains virtually constant as shown by the constant resistance region 16 of the response curve. Since the resistance is virtually constant, the current is virtually constant. The temperature of the element 13 increases until it reaches the PTC region 17 of the response curve. The resistance then increases exponentially as the temperature increases. As the resistance increases the current decreases until the temperature and current level off. The resistance then reaches a steady state at some point above the knee 18 in the curve.

When the element 13 is submerged in a liquid, usually water, the liquid carries away heat from the element which reduces its temperature. As the temperature of the element decreases below the knee 18, its resistance decreases until it reaches the virtually constant resistance region 16. At this point the resistance and current are substantially constant and heat generated by the element 13 is carried away by the liquid. Whether an element is submerged can be determined by measuring its resistance. If its resistance is in the constant resistance region 16, the element is submerged. If the element is not submerged, its resistance will be in the PTC region 17. If an element is partially submerged its resistance will be in the PTC region 17, but below the resistance of an unsubmerged element. If the resistive strip 12 is installed on the outside of the container 14, the liquid can conduct heat away from each of the elements 13 near and below the liquid level 15 through the wall of the container 14.

When a plurality of these resistive elements 13 are connected together in a PTC resistive strip 12 and mounted in a tub 14, the liquid level 15 in the tub can be determined by measuring the resistance of the resistor circuit in the strip 12. As the liquid level 15 rises over each element 13, its resistance, and thus, the resistance of the strip 12, decreases proportionally to the number of elements which are submerged. The voltage drop across the strip can be compared to a reference which will give an indication of the liquid level in the tub. In this manner, the liquid level can be monitored over a continuous range of levels.

Resistive strips other than the kind shown in FIG. 1 can also be used. For example, resistive elements 13 can be placed in series with the elements shown in parallel. Alternatively, a single elongated element could be used. It would be partially submerged so that its resistance would vary proportionally with the liquid level.

Figure 5:
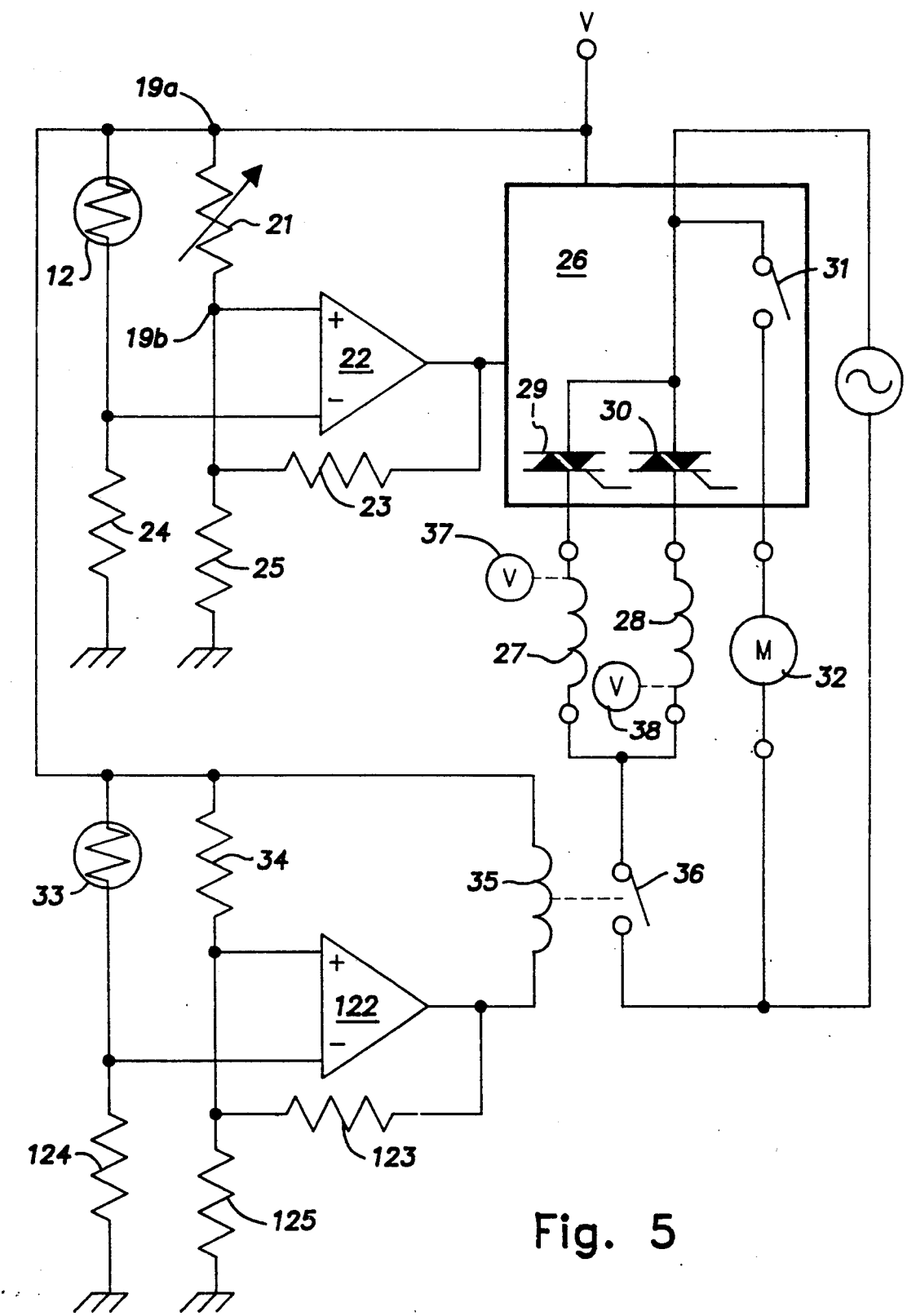
FIG. 5 is a schematic view of a washer control circuit using the present invention.

FIG. 5 shows a typical circuit which can be used to monitor and control the liquid level 15 in a clothes washer. A voltage V is applied to one end of the resistive strip 12 so that a current flows through the strip. Two reference points 19a and 19b and a means 21 to vary the voltage drop between the two points 19a and 19b are provided. A voltage is applied across reference points 19a and 19b. Preferably, the voltage V is applied to one end of a variable resistance 21, for example, a rheostat or potentiometer, so that a current flows through it. However, another voltage can be used. Means to compare the voltage across the variable resistance 21 with the voltage across the PTC strip 12 are provided. Preferably, the voltage comparison means is a comparator 22. The strip 12 is connected to a first input of a comparator 22 and the variable resistance 21 is connected to a second input of the comparator 22. A feedback resistor 23 is connected between the comparator output and the variable resistance 21. The inputs to the comparator 22 are connected to ground through resistors 24 and 25. The variable resistance 21 is set at a reference resistance which represents the desired liquid level 15. That is, the resistance of the variable resistance 21 should be set at the resistance which the strip 12 will have when the liquid is at a desired level. When the liquid reaches a level where the resistance of the strip 12 is approximately equal to the resistance of the variable resistance 21, the voltage at each of the inputs to the comparator will be approximately equal and the comparator output will signal an input to a control circuit 26. The values of the resistors 23, 24 and 25 should be selected so that the range of variable resistance settings corresponds to the range of liquid levels to be sensed and to provide a suitable signal to the control circuit 26.

A typical washer control circuit 26 is shown having hot and cold water supply valves 37 and 38 which are controlled by coils 27 and 28 or other electrical means. Triacs 29 and 30 or other electrically operated switching devices are connected in series with the coils 27 and 28. A motor control switch 31 is connected in series with a motor 32. When the liquid has reached the desired level as set on the variable resistance 21, the signal from the comparator 22 to the control circuit 26 causes the control circuit to close the water supply valves 37 and 38 via the triacs 29 and 30 by deenergizing coils 27 and 28 and to energize the motor 32 by closing the motor control switch 31. Other functions can also be controlled by the control circuit 26 in response to the liquid level signal.

A second sensing circuit can also be added to sense an overfill condition. A separate PTC element 33 replaces resistive strip 12 and a fixed resistor 34 replaces the variable resistance 21. The resistance of the resistor 34 is selected to be equal to the resistance of the PTC element 33 when the element is submerged. The resistors 123, 124 and 125 are similar to resistors 23, 24 and 25 and the comparator 122 is similar to comparator 22 in the first circuit described above. The output of the comparator 122 is connected to a coil 35 which operates a contact 36 which can disconnect power to the valve coils 27 and 28. The PTC element 33 is mounted in the tub above the top of the resistive strip 12. If the tub 1 is overfilled, the PTC element 33 becomes submerged and the voltage at the two inputs to the comparator 122 are identical. The comparator output then opens the contact 36 via the coil 35 which closes the valves and shuts off the liquid supply to the tub 14.

The present invention has been described as applied to a washing machine control circuit, however the liquid level sensing circuit can be used in any application in which electrical monitoring of a liquid level is desired.

The present disclosure describes several embodiments of the invention, however, the invention is not limited to these embodiments. Other variations are contemplated to be within the spirit and scope of the invention and appended claims.

What I claim is:
1. A circuit for sensing the level of a liquid in a container, comprising:
  a positive temperature coefficient resistive strip installable on a wall of the container, so that liquid in proximity to the strip can carry away heat to reduce the resistance of the strip, and adapted to have a voltage supplied to it when the circuit is energized;
  means to selectively vary a voltage drop between two reference points; and
  means to compare the voltage across the PTC strip with the voltage between the two points so that when the liquid in the container reaches a level where the voltage drop across the PTC strip is approximately equal to the voltage drop between the two points, an output of the comparison means indicates that the liquid is at a specified level.

2. A sensing circuit according to claim 1, wherein the liquid is water.

3. A sensing circuit according to claim wherein the container is a washing machine tub.

4. A sensing circuit according to claim wherein the comparison means is a voltage comparator.

5. A sensing circuit according to claim 1, wherein the means to compare voltages is connected to a control circuit.

6. A sensing circuit according to claim 5, wherein the control circuit is connected to operate at least one liquid supply valve.

7. A sensing circuit according to claim 6, wherein the control circuit is connected to operate a motor control switch.

8. A sensing circuit according to claim 1, wherein the PTC strip comprises a plurality of PTC elements electrically interconnected.

9. A sensing circuit according to claim 8, wherein the PTC elements are connected in parallel.

10. A sensing circuit according to claim 1, wherein the PTC strip is PTC resistive ink silk screened on a thin film and sealed water tight.

11. A sensing circuit according to claim 1, wherein the PTC strip is mounted on the inside of the container with one end near the top of the container and one end near the bottom of the container.

12. A sensing circuit according to claim 1, wherein the means to vary voltage drop is a variable resistance.

13. A sensing circuit according to claim 12, wherein the variable resistance is a rheostat.

14. A sensing circuit according to claim 1, wherein the voltage supplied to the PTC strip is also supplied to the means to vary the voltage drop.

15. A circuit for sensing the level of a liquid in a container, comprising:
a positive temperature coefficient resistive strip installable on a wall of the container, so that liquid which contacts the strip can carry away heat to reduce the resistance of the strip, and adapted to have a voltage supplied to it when the circuit is energized;
means to selectively vary a resistance between two reference points adapted to have a voltage supplied to it; and
means to compare the voltage across the PTC strip with the voltage between the two points so that when the liquid in the container reaches a level where the voltage drop across the PTC strip is approximately equal to the voltage drop between the two points, an output of the comparison means indicates that the liquid is at a specified level.

16. A circuit for sensing the level of a liquid in a container, comprising:
a positive temperature coefficient resistive strip installable in the container, so that the liquid can contact the PTC strip thereby carrying away heat to reduce the resistance of the strip, and adapted to have a voltage supplied to it when the circuit is energized;
means to selectively vary a voltage drop between first and second reference points;
first means to compare the voltage across the PTC strip with the voltage between the first and second reference points so that when the liquid in the container reaches a level where the voltage drop across the PTC strip is approximately equal to the voltage drop between the first and second reference points, an output of the first comparison means indicates that the liquid is at a specified level;
a separate positive temperature coefficient resistive element located above the PTC strip so that any liquid above the PTC strip will be in proximity to the separate PTC element thereby carrying away heat to reduce the resistance of the separate PTC element and adapted to have a voltage supplied to it;
means to create a voltage drop between third and fourth reference points wherein the third reference point may be identical with the first reference point; and
a second means to compare the voltage across the separate PTC element with the voltage between the third and fourth reference points so that when the liquid in the container reaches a level where the voltage drop across the separate PTC element is approximately equal to the voltage drop across the third and fourth reference points, an output of the second comparison means indicates that the liquid is above the PTC strip.

* * * * *

UNITED STATES PATENT AND TRADEMARK OFFICE
CERTIFICATE OF CORRECTION

PATENT NO. : 5,197,329
DATED : March 30, 1993
INVENTOR(S) : Andrew G. Grundy It is certified that error appears in the above-identified patent and that said Letters Patent is hereby corrected as shown below:

Column 3, line 23, delete "16".

Column 4, line 2, delete "to" and insert --of--; and line 35, delete "1" and insert --14--.

Column 5, Claim 3, line 3, after "claim" insert --1,--; and

Claim 4, line 5, after "claim" insert --1,--.

Signed and Sealed this

Eleventh Day of January, 1994

*Attest:*

BRUCE LEHMAN

*Attesting Officer*     *Commissioner of Patents and Trademarks*